US006768279B1

(12) United States Patent
Skinner et al.

(10) Patent No.: US 6,768,279 B1
(45) Date of Patent: Jul. 27, 2004

(54) REPROGRAMMABLE MOTOR DRIVE AND CONTROL THEREFORE

(75) Inventors: James Skinner, St Louis, MO (US); John Stephen Thorn, St. Louis, MO (US); Craig Nordby, St. Louis, MO (US); Joseph G. Mercinkiewicz, St. Louis, MO (US)

(73) Assignee: Emerson Electric Co., St Louis, MO (US)

( * ) Notice: Subject to any disclaimer, the term of this patent is extended or adjusted under 35 U.S.C. 154(b) by 1768 days.

(21) Appl. No.: 08/250,286

(22) Filed: May 27, 1994

(51) Int. Cl.[7] .............................................. H02P 7/00
(52) U.S. Cl. ...................................................... 318/254
(58) Field of Search ................................. 318/254, 256, 318/439, 138, 365.23, 706; 15/319; 388/964, 402.5

(56) References Cited

U.S. PATENT DOCUMENTS

| 3,176,207 | A |   | 3/1965  | Wallace ........................ 318/67    |
|-----------|---|---|---------|-------------------------------------------|
| 4,477,874 | A | * | 10/1984 | Ikuta et al. .................. 364/424   |
| 4,659,145 | A | * | 4/1987  | Obersteiner ................ 318/568      |
| 4,683,411 | A | * | 7/1987  | Hamilton, Jr. et al. ...... 318/706       |
| 4,686,437 | A | * | 8/1987  | Langley et al. ............. 318/254      |
| 4,743,815 | A |   | 5/1988  | Gee et al. ................... 318/254    |
| 4,986,092 | A |   | 1/1991  | Sood et al. ...................... 68/12  |
| 5,023,528 | A | * | 6/1991  | Saidin et al. ................ 318/254    |
| 5,115,181 | A |   | 5/1992  | Sood .......................... 318/701   |
| RE34,286  | E | * | 6/1993  | Toyoshima et al. ........... 15/319       |
| 5,235,504 | A |   | 8/1993  | Sood ............................. 363/53 |
| 5,241,257 | A |   | 8/1993  | Nordby et al. .............. 318/811      |
| 5,276,939 | A | * | 1/1994  | Uenishi ........................ 15/319   |
| 5,294,872 | A | * | 3/1994  | Koharagi et al. ........... 318/254       |

* cited by examiner

Primary Examiner—Jonathan Salata
(74) Attorney, Agent, or Firm—Howrey Simon Arnold & White LLP

(57) ABSTRACT

A drive apparatus for use with a dynamoelectric machine system includes drive means connected to the dynamoelectric machine to control at least one of the current or voltage of the machine and a processor including a microcontroller for supplying machine control information to the drive means. A plurality of switches are connected to the processor and art positionable in a plurality of switch settings. Preselected switch settings correspond to operating characteristic information associated with corresponding versions of a given appliance, such that a user positions the switches in a desired switch setting to select the corresponding version of the given appliance. The microcontroller is programmed to read the switch setting and in response thereto, obtain the system operating characteristic information corresponding to the selected version of the given appliance from said second memory so as to permit the system to be used in different versions of the given appliance.

4 Claims, 2 Drawing Sheets

REPROGRAMMABLE MOTOR DRIVE AND CONTROL THEREFORE

BACKGROUND OF THE INVENTION

This invention relates to dynamoelectric machines in the form of electric motors, and more particularly, to a simple, effective way of controlling operation of a motor when used by different manufacturers for different purposes. While the invention is described in particular detail with respect to its application in appliances, those skilled in the art will recognize the wider applicability of the inventive principles described hereinafter.

As is well-known in the art, electric motors are designed so that a particular motor has a different set of operating characteristics for one application, and another set of operating characteristics for other applications. Heretofore, motors were designed and tested with respect to a specific application until the operating criteria met desired goals. For example, with heating and air conditioning systems (HVAC), it is common to employ a motor to drive the blower for the HVAC system. The motor design can vary depending upon a number of anticipated load characteristics. The load characteristics, in turn, are a function of a number of variables, including the type of air handler used with a motor, and can vary from one manufacturer to another. The problem is further complicated because of the variety of electric motor "types" available for use in HVAC applications. For example, induction motors long have been the predominant choice in blower applications. More recently, brushless permanent magnet, switched reluctance, controlled induction, and similar electronically operated motors have found use in such applications.

While a motor design for a blower application has a general set of operating features, each manufacturer incorporating a similar motor in its product wants or requires a different set of operating characteristics, because of that particular manufacturer's construction or the manufacturer's perception of his customer's needs. Even a single manufacturer often provides a series of models having varying capabilities. As a consequence, motor manufacturers heretofore have provided a number of different models of essentially the same motor design altered to accomplish the specific needs either of a particular original equipment manufacturer's (OEM) customer's requirements or, to satisfy the needs of the various OEM manufacturers. The large number of motor models, in turn, creates a problem for the motor manufacturer. Parts inventory and overhead costs increase with increased part numbers. Even when such costs are minimized, however, the motor manufacturer's assembly line often requires shut down in order to convert from one model to another model, thereby increasing labor costs.

The OEM manufacturer also incurs increased costs because the OEM must stock and track a variety of motors for its various product lines.

It thus is seen that a motor manufacturer can reduce costs if the manufacturer had the ability to produce one version of a motor for a particular application, the motor being readily adapted after manufacture, for each different OEM's particular set of operating requirements. It also is advantageous to enable a particular motor to be used across a range of models for a particular OEM, based on function and performance of any particular model. Another advantage of our invention is that the OEM manufacturer is able to supply motors to fit new applications more quickly.

One of the objects of this invention is to provide a drive apparatus for a dynamoelectric machine.

Another object of this invention is to provide a drive apparatus for a dynamoelectric machine which enables essentially the same dynamoelectric machine construction to be used in a variety of versions of an appliance.

Another object of this invention is to provide a drive apparatus which is adaptable after manufacture to a variety of usages.

Another object of this invention is to provide a motor drive incorporating a microcontroller which has a set of parameters or an operating program sequence for the motor stored in it, a second memory having a series of data stored in association with it, and switches operatively connected to the microcontroller to enable the microcontroller to select the appropriate data for operation of the motor.

Another object of this invention is to provide a drive means with an associated motor capable of use over both a wide range of manufacturers and over a range of products of a single manufacturer.

Another object of this invention is to provide a drive which is designed to operate an electric motor satisfactorily under a wide range of selectable conditions.

Another object of this invention is to provide a drive apparatus which reduces inventory control problems for both the motor manufacturer and the original equipment manufacturer.

Another object of this invention is to provide a motor drive which is low in cost and which is readily associated with the motor structure.

Still another object of the invention is to provide a motor and motor drive in which operative characteristics of the motor can be changed without the use of special tools or equipment.

Other objects of this invention will be apparent to those skilled in the art in light of the following description and accompanying drawings.

SUMMARY OF THE INVENTION

In accordance with this invention, generally stated, a drive apparatus for use with an electric motor is provided having a low cost microcontroller adapted to operate a motor drive. The motor drive is operatively connected to the electric motor to control at least one of the current or voltage of the motor. The microcontroller supplies control information to the drive. In the preferred embodiment, the microcontroller includes a program module in the form of a ROM for controlling motor operation. A second and nonvolatile memory module in the form of an EEPROM is provided for storing motor operating characteristic information, the information being accessible by the microcontroller. Multi-position switches are connected to the processor module. The data in the second memory module determines the function of the switches. Data in the second memory module also determines the operating condition (values, parameters) of the drive apparatus. A separate programming device is used to download data to the microcontroller and to the second memory module. A plurality of switches, for example, are selectable by an installer of the motor, and the switch settings determine which functions the program module executes and how the program module uses the data stored in the second memory module. With this arrangement, one motor design may be used for one set of operating characteristics of the motor, while a second set of operating conditions may be obtained merely by changing the switch settings. In the alternative, data may later be loaded to the nonvolatile memory which alters the information selectable by the switches and the program flow thereby alters the operating characteristics of the motor.

BRIEF DESCRIPTION OF THE DRAWINGS

Corresponding reference characters indicate corresponding parts throughout the drawings.

DESCRIPTION OF A PREFERRED EMBODIMENT

Figure 1:
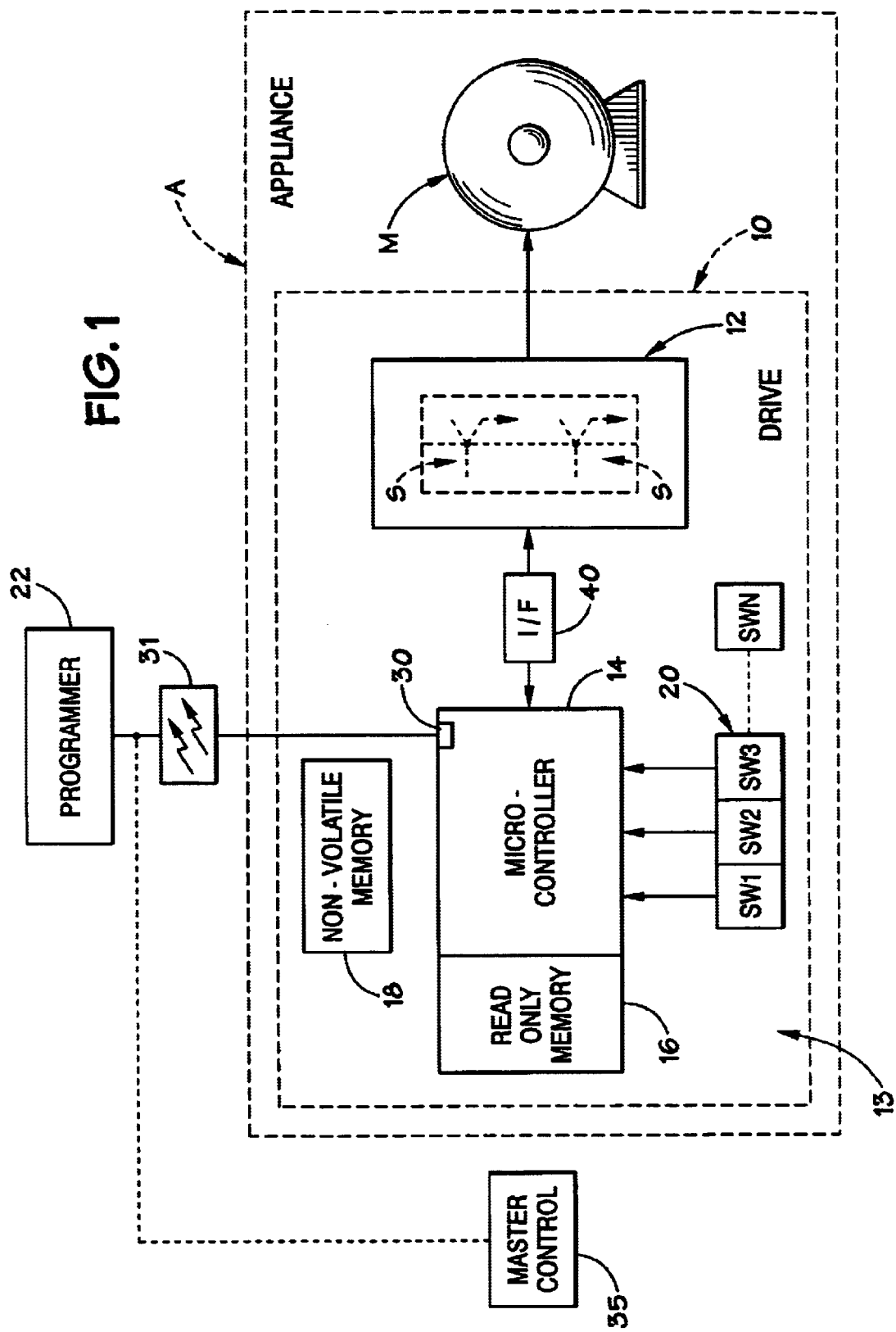
FIG. 1 is a block diagram of one illustrated embodiment of drive apparatus of the present invention.

Referring now to FIG. 1, a dynamoelectric machine M is operatively associated with an appliance A. As indicated above, appliance A may be any of a variety of conventionally available devices taking the form, for example, of furnace blowers, compressor motors, washing machines, dryers, and other similar related applications. The motor M also is intended to be any of a variety of known constructions. For example, the motor may be a brushless permanent magnet, switched reluctance motor or controlled induction motor. Each of these motor types differ primarily in the construction of their rotors. Thus, the controlled induction motor employs what is known in the art as a squirrel cage induction motor rotor, while a switched reluctance motor employs an iron core rotor which may have a special configuration but is constructed without the rotor bars of the squirrel cage design. The brushless permanent magnet motor has permanent magnets associated with the rotor. The stator assemblies of any of the motors generally are conventional designs, although the windings of the stator assembly often are specifically designed to enhance the performance characteristics of each of the motor types.

As will be appreciated by those skilled in the art, there are a number of original equipment manufacturers of appliance products. Each manufacturer's specific products differ in design and capability from those of other manufacturers. In addition, each OEM often has a range of products offering differing capabilities in its particular product line. Thus, even though a particular motor M is of a standard design well suited for use in a particular appliance A, a motor manufacturer may be required to make the motor M in a number of different models to satisfy market requirements.

A drive apparatus 10 of the present invention allows a motor manufacturer to make a single model of a motor M, but still enables an OEM to tailor the drive apparatus to a variety of applicational uses. The apparatus 10 further allows each OEM to install the motor M in a product having a set of operating characteristics unique to that manufacturer. Thereafter, the drive apparatus 10 may be adjusted to provide proper operating performance in the particular application.

Apparatus 10 includes a drive means 12 operatively associated with the motor M. The drive means 12 is, in the preferred embodiment, a conventional inverter bridge circuit operatively connected to the stator assembly of motor M. The inverter bridge operates to control at least one of the current or voltage of motor M. That is, the drive means 12 includes a plurality of power switching devices S, as represented by power transistors, for example, for controlling current flow through the motor phase windings (not shown). The drive means 12 controls the motor so that it operates at any one of a particularly selected condition. The selected condition depends on a variety of application characteristics, as described in greater detail hereinafter. In this regard, the drive means 12 is responsive to control inputs provided to it to vary at least the current or the voltage input to the motor M. At the same time, the drive means provides information concerning the instantaneous operating conditions of the motor to a microcontroller 14 through a suitable interface 40.

A processing means 13 of apparatus 10 supplies motor control information to drive means 12. Processing means 13 includes the microcontroller 14. The microcontroller 14 has a first memory means associated with it in the form of a read only memory (ROM) module 16. Module 16 includes a fixed program which is inscribed in it during its manufacture. The program allows microcontroller 14 to control operation of motor M under various appliance operating conditions. The microcontroller 14 also has associated with it a second nonvolatile memory means in the form of an electrically erasable programmable read only memory (EEPROM) 18. The memory module 18 has data stored in it used to control operation of motor M. As indicated, EEPROM 18 is a nonvolatile memory, so that motor operating characteristic information stored therein is not lost when power is removed from the apparatus A. While EEPROM 18 is shown as a separate block in FIG. 1, those skilled in the art will recognize that a single integrated circuit may include what is shown separately in the drawings as microcontroller 14, ROM 16 and EEPROM 18.

Figure 2:
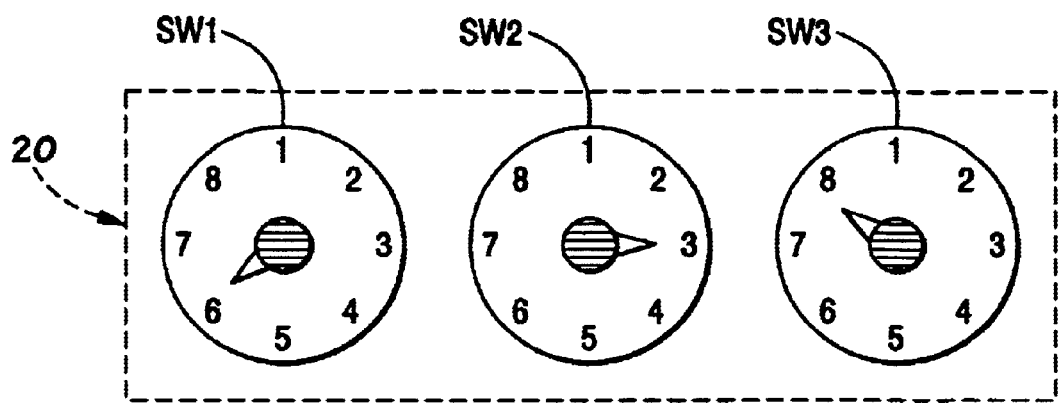
FIG. 2 is a view of selection switches used in conjunction with the drive apparatus of FIG. 1 to select motor operational data.

Microcontroller 14 has an input 30. The input 30 preferably is connected to an external device through an opto-coupler 31. Microcontroller 14 also has a plurality of switches 20, operatively connected to it through input lines or ports. In the embodiment illustrated, the switches are manually operable multi-position switches SW1–SWN. The switches are shown as eight position manually operable rotary switches in FIG. 2. It will be understood, however, that the switches may have any reasonable number of switch positions. Also, the various switches need not have the same number of positions as each of the other switches; and, various other types of switch constructions are compatible with the broader aspects of our invention. For the three, eight position switches SW1–SW3 shown in FIG. 2, there are 512 (8×8×8) possible switch settings which an installer or user of the motor can select.

A programming device 22, which can be a general purpose computer or a special use device, for example, is operatively connected through the opto-coupler 31 to the input 30 of the microcontroller 14. The programmer 22 is utilized to download appropriate data through the microcontroller to the EEPROM 18. The programmer 22 allows the motor manufacturer or OEM both to download appropriate information at the time of manufacture, and to update that information at a later time. If, for example, a new application is found for the motor, information relevant to that use can be loaded into the memory 18 as each new unit is constructed. Fabrication of a new memory chip is not required. Similarly, if previous motor operating data is refined, the memory in existing units is readily updated without having to recall or retrofit existing units.

As indicated, the programmer 22 is removably connected to drive apparatus 10. In applicational use, a system master control may be connected to the input 30. For example, in HVAC systems, it is conventional for a thermostat and thermostat wires to be connected to the blower motor control. Such wires would, with our invention, instead be connected to the microcontroller 14 through suitable input means.

The switches 20 are used to select relevant portions of the data contained in the memories 16 and 18. For example, the switch position may represent fan blower constants employed in the control algorithm for an HVAC system. The start delay for application for the furnace blower, i.e., the time between the energization of the heat element of the furnace, for example, and blower start up also can be indicated by switch position. Likewise, the stop delay, that is, the time between de-energization of a heating element, for example, and motor speed reduction, because of the heater turn-off, also may be selected by a switch position. Various commands representing desired air flow also can be represented by the switch positions. As will be appreciated by those skilled in the art, individual ones of the switch positions need not affect the variable selected by another of the switch positions. Thus, our invention allows considerable variation in function selections in determining system operation.

Figure 3:
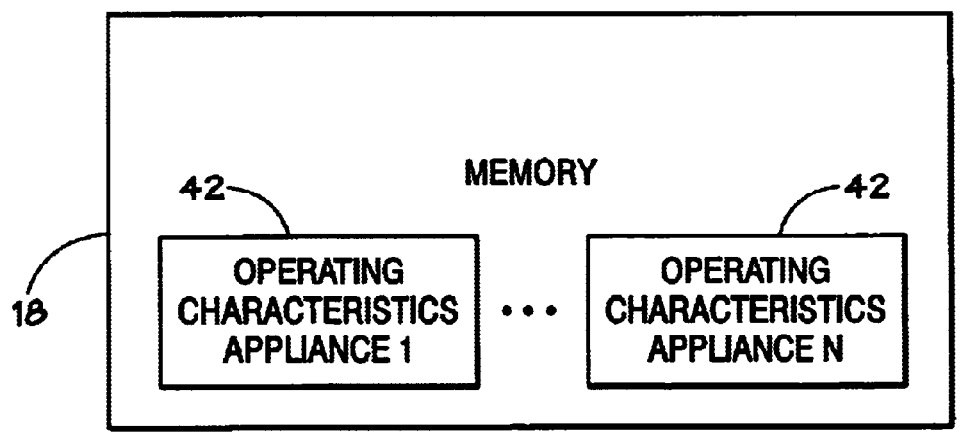
FIG. 3 is a block diagram of a memory containing operating characteristics associated with different versions of an appliance.

In operation, the microcontroller 14 reads switch 20 and the information set by the switches to obtain data for motor M operation. The microcontroller 14 also reads the commands from a system master controller 35, and utilizing the information available from the system master controller and the switches, accesses the data in the memory 18 to operate motor M. The ability to use the switch readings to access data in the memories 16 and 18, in which the data in memory 18 may be altered after apparatus construction, is an important feature of our invention in that it enables a motor manufacturer to use a single motor model in a wide variety of applicational uses merely by altering the switch position of the switches 20. The use of the switches 20 enables one user of the motor M to select one set of operating characteristics for the motor by making one switch setting, while a second user can, by altering the switch selection position, enable the microcontroller 14 to access other operating data information in the memories 16 and 18. The apparatus, and the electric motor M applied to the apparatus, is usable in different versions of the same appliance, and enables the appliance manufacturer to offer a unique set of operating characteristics for each such use. For example, FIG. 3 shows the memory 18 having operating characteristics 42 therein associated with versions 1-n of an appliance. The ability of the control of this invention to read the switch 20 position and associated that position with data downloadable to a nonvolatile memory enables motors produced in accordance with this invention to offer a range of programmability and functionality not heretofore associated with motor designs. This result is achieved at a relatively low cost.

In view of the foregoing, it will be seen that the several objects of the invention are achieved and other advantageous results are obtained. Numerous variations, within the scope of the invention, will be apparent to those skilled in the art in light of the foregoing description and accompanying drawings. Merely by way of example, the apparatus may be packaged with the motor itself, or may form a separate unit operatively connected to the motor in application use. As indicated, the various memories associated with the microcontroller 14 may be incorporated in an integrated design, or the memories may be separate units associated with the microcontroller 14 in a conventional manner. Other memory devices may be employed. While preferably the program for operation of the microcontroller was described as being loaded during ROM manufacture, both the program and data for that program may be downloaded by the programmer in other embodiments of the invention. These variations are merely illustrative.

Having thus described the invention, what is claimed and desired to be secured by Letters Patent is:

1. Drive apparatus for use with a dynamoelectric machine system, comprising:

drive means connected to the dynamoelectric machine to control at least one of the current or voltage of the machine;

a processor including a microcontroller for supplying machine control information to the drive means, said processor including a first memory including a read only memory containing at least a portion of an operating program for operating the dynamoelectric machine;

a second memory operatively associated with said processor, said second memory including a non-volatile electrically erasable programmable read only memory for storing dynamoelectric machine operating characteristic information associated with a plurality of appliance environments, wherein said plurality of appliance environments comprises a plurality of versions of a given appliance;

a plurality of switches positionable in a plurality of switch settings connected to said processor, wherein preselected switch settings correspond to one of the versions of the given appliance such that a user positions said plurality of switches in a desired switch setting to select the corresponding version of the given appliance, said microcontroller being programmed to read the switch setting and in response thereto, obtain the system operating characteristic information corresponding to the selected version of the given appliance from said second memory so as to permit said system to be used in different versions of the given appliance; and programming means operatively attachable to said processor and removable therefrom for loading dynamoelectric machine information associated with said versions of the given appliance into said second memory to enable said drive apparatus to be altered for use with a variety of dynamoelectric machines in different versions of the given appliance.

2. The drive apparatus of claim 1, wherein said plurality of versions of the given appliance comprise versions of the given appliance made by different manufacturers.

3. A method of controlling operation of an electric motor adapted for use in an appliance, comprising:

connecting a motor drive to the motor to control at least one of the current and voltage applied to the motor;

downloading motor operating characteristic information associated with a plurality of appliance environments to a memory device from a programmer connected to said memory device, wherein said plurality of appliance environments comprises a plurality of versions of a given appliance;

selecting one of said versions of the given appliance for said motor by setting the position of at least one of a plurality of switches;

reading the motor characteristic information associated with the selected version of the given appliance from said memory device; and operating said motor drive in response to said motor operating characteristic information associated with the selected version of the given appliance to allow use of said motor in a variety of versions of a given appliance.

4. The method of claim 3, wherein said plurality of versions of the given appliance comprise versions of the given appliance made by different manufacturers.

* * * * *